United States Patent
Mori et al.

(10) Patent No.: US 7,209,661 B2
(45) Date of Patent: Apr. 24, 2007

(54) WAVELENGTH MULTIPLEXING METHOD AND AN APPARATUS THEREOF

(75) Inventors: Shota Mori, Kawasaki (JP); Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 650 days.

(21) Appl. No.: 10/686,670

(22) Filed: Oct. 17, 2003

(65) Prior Publication Data
US 2004/0081421 A1    Apr. 29, 2004

(30) Foreign Application Priority Data
Oct. 18, 2002    (JP)    ............... 2002-303896

(51) Int. Cl.
    H04J 14/00    (2006.01)
    H04J 14/02    (2006.01)
(52) U.S. Cl. ............... 398/79; 398/82; 398/43
(58) Field of Classification Search ............... 398/79, 398/42, 43, 75, 82
    See application file for complete search history.

(56) References Cited

U.S. PATENT DOCUMENTS

| 6,671,466 B1* | 12/2003 | Banerjee et al. ............... 398/79 |
| 6,768,831 B2* | 7/2004 | Maeda ............... 385/24 |
| 2003/0025965 A1* | 2/2003 | Takatsu et al. ............... 359/124 |

FOREIGN PATENT DOCUMENTS

JP    9-261205    10/1997

* cited by examiner

Primary Examiner—M. R. Sedighian
(74) Attorney, Agent, or Firm—Staas & Halsey LLP

(57) ABSTRACT

An optical wavelength multiplexing apparatus is capable of controlling an attenuation amount of a variable optical attenuator at high speed, thereby preventing an optical level change generated by an upstream WDM section from flowing into a downstream WDM section.

The high speed control is realized by providing a fast-operating local feedback loop for each variable optical attenuator in addition to a slower main feedback loop.

11 Claims, 14 Drawing Sheets

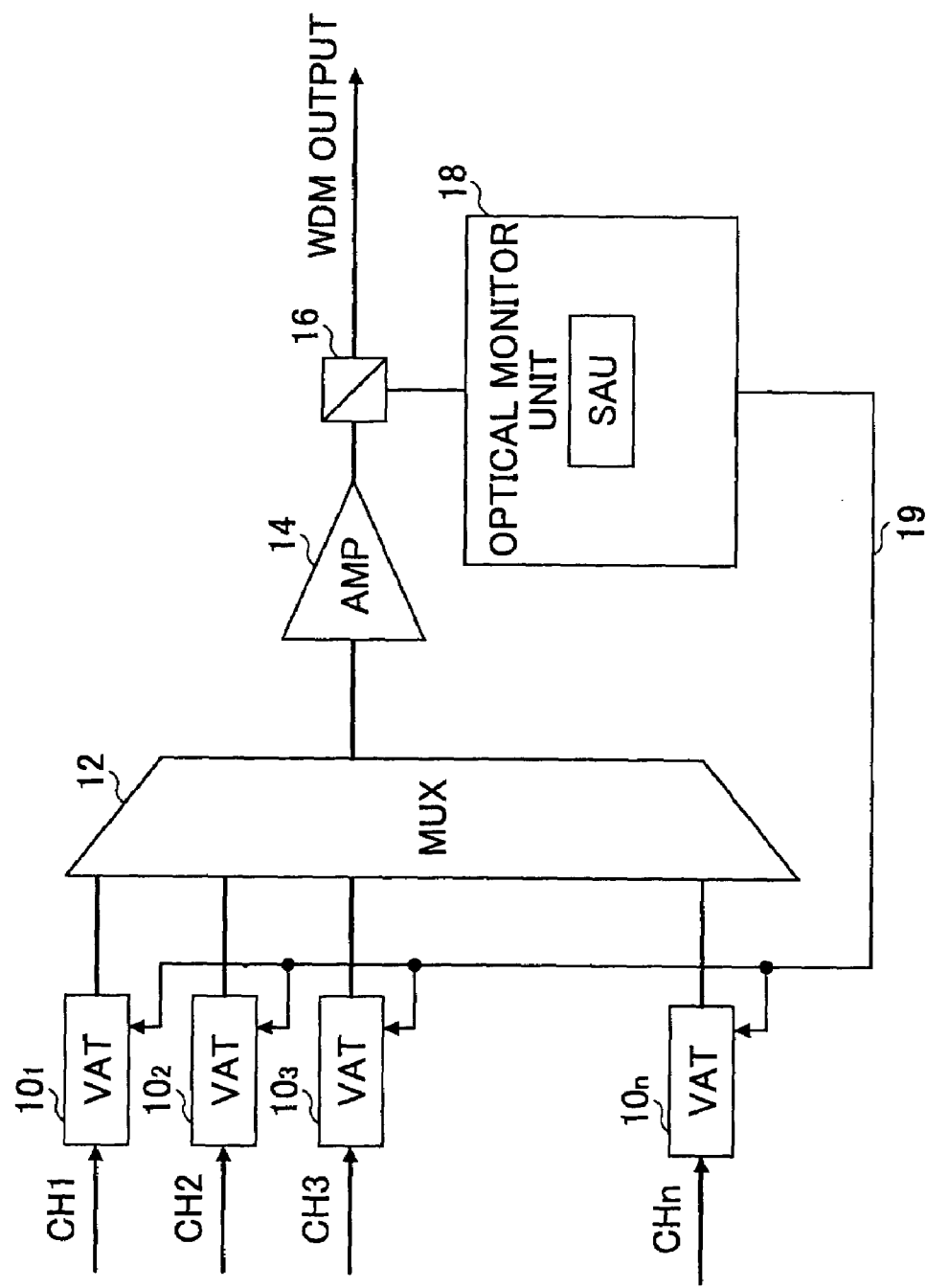

WAVELENGTH MULTIPLEXING METHOD AND AN APPARATUS THEREOF

BACKGROUND OF THE INVENTION

1. Field of the Invention

The present invention generally relates to a wavelength multiplexing method, and an apparatus thereof, and especially relates to the wavelength multiplexing method of a WDM (Wavelength Division Multiplexing) optical transmission system, and the apparatus thereof.

2. Description of the Related Art

In WDM optical transmission systems, transmission characteristics are heavily reliant upon power and optical SNR (signal to noise ratio) of each of the wavelengths, serving as optical channels, which are multiplexed. For this reason, the power levels of all the wavelengths are required to be equal to each other. To achieve this, each wavelength is input into a variable optical attenuator (VAT), and the power levels of the input wavelengths are made equal to each other by attenuating the power (for example, patent reference 1 listed below is referred to).

FIG. 1 shows a block diagram of an example of a conventional wavelength multiplexing apparatus (WDM apparatus). In FIG. 1, wavelengths CH1 through CHn are supplied to variable optical attenuators $10_1$ through $10_n$, respectively, and are multiplexed by a multiplexing unit (MUX) 12. The multiplexed wavelengths constitute an optical signal, which is amplified by a transmitting amplifier (AMP) 14, and is output to an optical transmission path.

A part of the optical signal output from the transmitting amplifier 14 is branched (split off) at an optical coupler 16, and the branched part of the optical signal is supplied to an optical monitor unit 18. The optical monitor unit 18 performs an optical spectrum analysis with an optical spectrum analyzer (SAU), calculates an attenuation amount to be provided by each of the variable optical attenuators $10_1$ through $10_n$, and controls the variable optical attenuators $10_1$ through $10_n$ via a serial interface 19 such that the optical power levels of all the wavelengths become equal.

Patent Reference 1

Japanese Provisional Patent No. H9-261205.

The above-mentioned conventional method is mainly for a point-to-point system, among various configurations of WDM systems, as shown at (A) of FIG. 2, where an input wavelength is provided by a stable optical source, such as a transponder. For this reason, the conventional method poses certain problems in a WDM system that is configured differently, namely, in the case of an add/drop apparatus 20 wherein a wavelength (channel) is branched (dropped) and another wavelength is inserted (added) as shown at (B) of FIG. 2, and a cross connect apparatus 22 that performs an optical switching function in units of wavelengths as shown at (C) of FIG. 2.

One of the conventional problems (the first problem) is relative to feedback speed, which is a function of operational performances of the optical spectrum analyzer and the variable optical attenuators. The optical spectrum analyzer monitors all the wavelengths that are multiplexed. In a typical monitoring method, a part of the optical signal is branched, and used for monitoring. The branched part of the optical signal is input to a diffraction lattice so that each wavelength is separated. Then, signal strength of each wavelength is measured by a sweeping operation.

FIG. 3 shows a conventional feedback control method. At Step S10, all the wavelengths are monitored by the optical spectrum analyzer SAU on the left-hand side of FIG. 3. At Step S11, a required attenuation amount of each wavelength is calculated based on variation among the wavelength levels. At Step S12, the required attenuation amount is transmitted to the respective variable optical attenuators VAT of each wavelength via the serial interface. Then, with reference to the right-hand side of FIG. 3, the required attenuation amount is received by the respective VAT at Step S13, and the respective attenuation amount of the VAT is changed to the required attenuation amount at Step S14. Consequently, at Step S15, the output level of the VAT is changed, and the output level of the corresponding wavelength (channel) is changed.

As for the signal strength of each wavelength being measured, in order to obtain an accurate measurement under this conventional method, the interval between measurements is required to be longer than 100 ms. Further, the serial interface, which is normally used for transmitting the required attenuation amount of each wavelength to the respective variable optical attenuator from the optical spectrum analyzer, is required to handle a large number of wavelengths, which is of a magnitude of 100, and growing.

Even if the measurement speed of the optical spectrum analyzer is improved by simultaneously monitoring all the wavelengths, there is a limit to improvement of the transmission speed of the serial interface. For this reason, feedback cycle cannot be raised to a desired high speed by the conventional method, wherein only the optical spectrum analyzer directly controls the required attenuation amount of the variable optical attenuators.

When the input level of an optical channel fluctuates, the conventional control method can respond to a slow change over a period longer than 100 ms, and such a slow change can be absorbed (dealt with). However, if the input level fluctuation is sudden over a period shorter than 100 ms, the fluctuation cannot be absorbed by the conventional method, and the fluctuation is passed on to a next stage as it is.

In the most fundamental WDM configuration, i.e., in the point-to-point configuration, all wavelengths (channels) are input from stable optical sources, such as a transponder, and the probability of the above sudden fluctuation occurring is low. On the other hand, in the case of the add/drop apparatus and the cross connect apparatus, an input wavelength is a signal that is individually branched from an upstream WDM apparatus. For this reason, a sudden, and often big fluctuation (power level change) may occur in the multiplexed optical signal. Unless a countermeasure is provided, the sudden and big level change falls out to a downstream WDM stage, which is the above first problem.

In the case of the add/drop apparatus and the cross connect apparatus, after the multiplexed optical signal is demultiplexed, some or all of the wavelengths are dropped or switched, and the switched wavelengths are multiplexed again, and transmitted. When multiplexing, it is necessary to make the transmitting level of all wavelengths uniform like the point-to-point configuration, requiring the feedback control function using the variable optical attenuator and the optical spectrum analyzer.

Major differences of the add/drop apparatus and the cross connect apparatus compared to the point-to-point configuration are sudden and great variations of the optical input level, which are often caused by change of the upstream output level due to incrementing and decrementing of the wavelengths of an upstream WDM apparatus (since the input to the multiplexing unit is the output of the upstream WDM apparatus), fall of the level due to failure of the optical amplifier, an instantaneous disconnection of the optical signal when changing a path at the optical switch, and an automatic back-off to a safe optical power level when an optical fiber is accidentally disconnected.

By the conventional control method, wherein the feedback speed is low, the sudden level change cannot be absorbed, but is passed on to a downstream WDM apparatus. Accordingly, where the WDM system is configured with multiple stages of add/drop apparatuses and cross connect apparatuses, the level changes are rapidly accumulated and passed downstream, causing receiver damage and signal error. This restricts the number of the stages of add/drop apparatuses and cross connect apparatuses.

Further, an automatic level control (ALC) is often provided for regulating the output power, which poses a risk of the ALC amplifying the sudden and great level change. This restricts the number of repeaters, and, therefore, the transmission distance. As the result, the performance of the transmission system is degraded.

The second problem is related to detection of an input signal that contains an ASE (amplified spontaneous emission). While an ASE is not contained in an optical signal from a stable optical source, as is the case of a point-to-point system, an ASE is contained in an optical signal in the case of the add/drop apparatus and the cross connect apparatus. This is because an ASE is generated when the optical signal passes through the optical amplifier in the upstream WDM apparatus. For this reason, in the case of the add/drop apparatus and the cross connect apparatus, the optical signal input to the VAT (variable optical attenuator) contains an ASE.

A threshold detection level alarm is set up at the VAT for detecting a disconnection and a level decline of the optical signal such that management and triggering of incrementing/decrementing of a wavelength are carried out. At this juncture, if an ASE is contained in the optical signal, detection may become inaccurate, for example, disconnection and level decline in the upstream WDM apparatus are not detected by the downstream VAT.

Consequently, incorrect operations take place, such as a proper optical signal being disconnected, and an optical signal containing only an ASE being transmitted to later stages.

The third problem is related to the dynamic range of the optical signal input to the variable optical attenuator VAT. An optical signal supplied from a stable optical source is relatively well regulated, varying within a range of about ±2 dB under normal operating conditions of, e.g., 0 dBm. On the other hand, in the case of the add/drop apparatus and the cross connect apparatus, an input signal is provided by the upstream WDM apparatus, where various factors cause great variation, which can range ±10 dB. The factors include a loss variation due to a tilting status (explained below) of the upstream WDM apparatus, a loss variation due to path differences relative to branching and adding, and a loss variation due to an increased number of optical connectors.

Although a variable optical attenuator providing a dynamic range of about 30 dB is available, its guaranteed input-and-output linearity range is limited to, e.g., about 10 dB or less. Accordingly, a highly precise level stabilization control with accuracy in the order of 0.1 dB, which is required by WDM, is difficult to obtain by the conventional method.

SUMMARY OF THE INVENTION

In view of above, it is a general object of the present invention to provide a wavelength multiplexing method and an apparatus thereof that substantially obviate one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by the wavelength multiplexing method and the apparatus thereof particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a wavelength multiplexing method and the apparatus thereof, wherein an attenuation amount of a variable optical attenuator is controlled at a high speed such that an optical level change generated in an upstream WDM section is prevented from flowing into a downstream WDM section, false detection indicating signal disconnection and signal level decline of an input optical signal that contains an ASE is prevented, and the input dynamic range, within which linearity of the variable optical attenuator can be guaranteed, is expanded.

In order to realize the high speed control of the attenuation amount of the variable optical attenuator, which is the first problem, the present invention provides a "local feedback loop" in addition to the conventional feedback loop, which is called the main feedback loop. Specifically, the attenuation amount is controlled by the output level of the variable optical attenuator (local feedback) every 1 ms or less with reference to the spectrum-analyzed output level (main feedback) about every 100 ms. This is in contrast to the conventional method wherein only the spectrum-analyzed output level directly controls the attenuation amount about every 100 ms.

In this manner, an optical level change generated by an upstream WDM section is prevented from flowing into the downstream WDM section.

With reference to the second problem, the present invention provides threshold value controlling means for changing the threshold value for detecting a disconnection and a level decline according to whether an input optical signal is from a stable optical source.

In this manner, correct detection of the disconnection and level decline is realized when the input optical signal contains an ASE.

With reference to the third problem, the present invention provides for cascading (placing in series) multiple variable optical attenuators for each wavelength.

In this manner, the input dynamic range of the variable optical attenuator, within which dynamic range accurate control is possible, is realized.

Further, the present invention provides attenuation amount controlling means for suppressing an attenuation amount corresponding to the difference between the spectrum-analyzed output level and the output level of the variable optical attenuator.

In this manner, oscillation of the variable optical attenuator is prevented from occurring.

BRIEF DESCRIPTION OF THE DRAWINGS

FIG. 1 is a block diagram of an example of a conventional WDM (wavelength division multiplexing) apparatus;

DESCRIPTION OF THE PREFERRED EMBODIMENTS

In the following, embodiments of the present invention are described with reference to the accompanying drawings.

The first problem of the conventional technology is solved by accelerating the feedback speed of the monitoring result obtained by the optical spectrum analyzer to the variable optical attenuator, thereby absorbing a level change generated by an upstream WDM section.

Figure 2A:
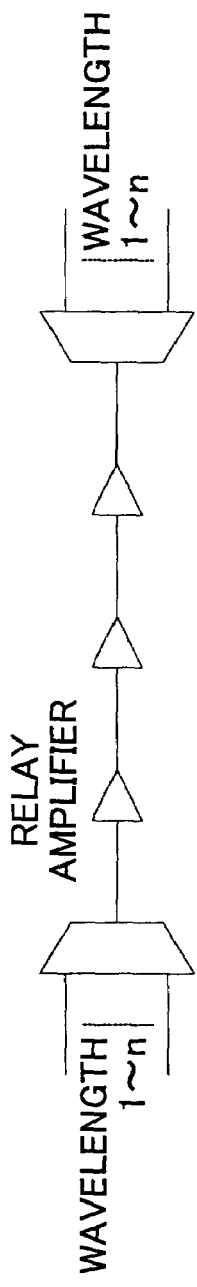
FIG. 2 shows configurations of various WDM apparatuses.
Figure 2B:
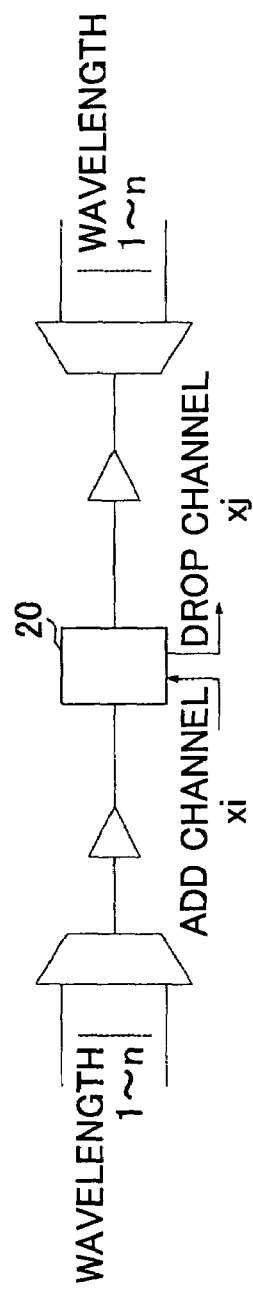
Figure 2C:
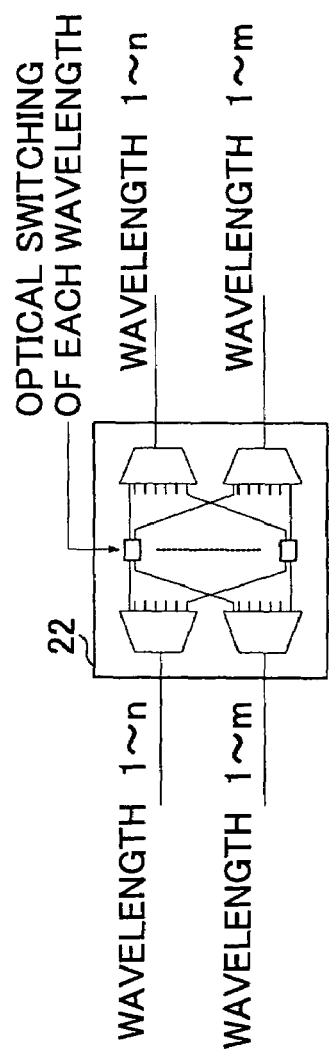
Figure 3:
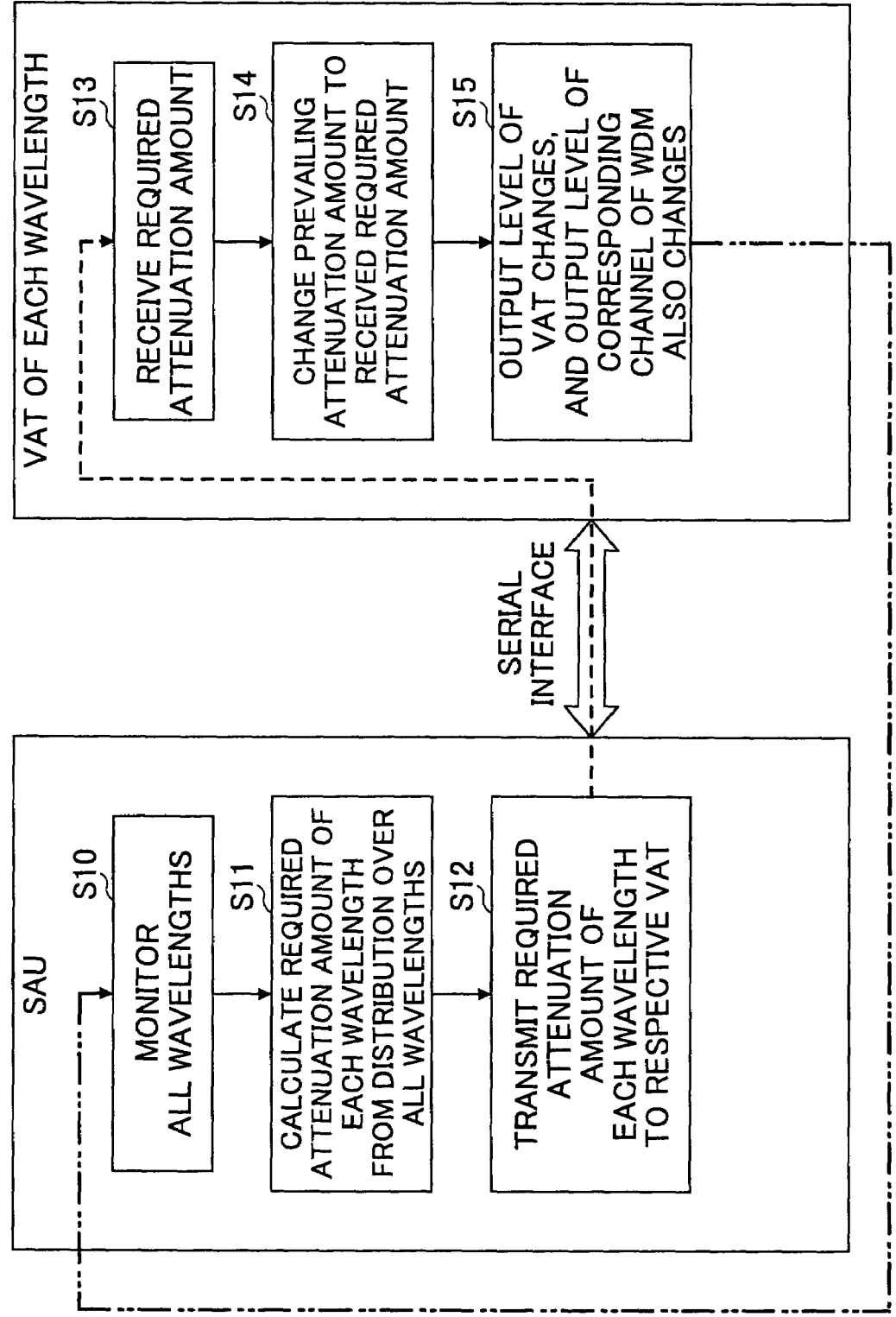
FIG. 3 shows a feedback control method of a conventional WDM apparatus.
Figure 4:
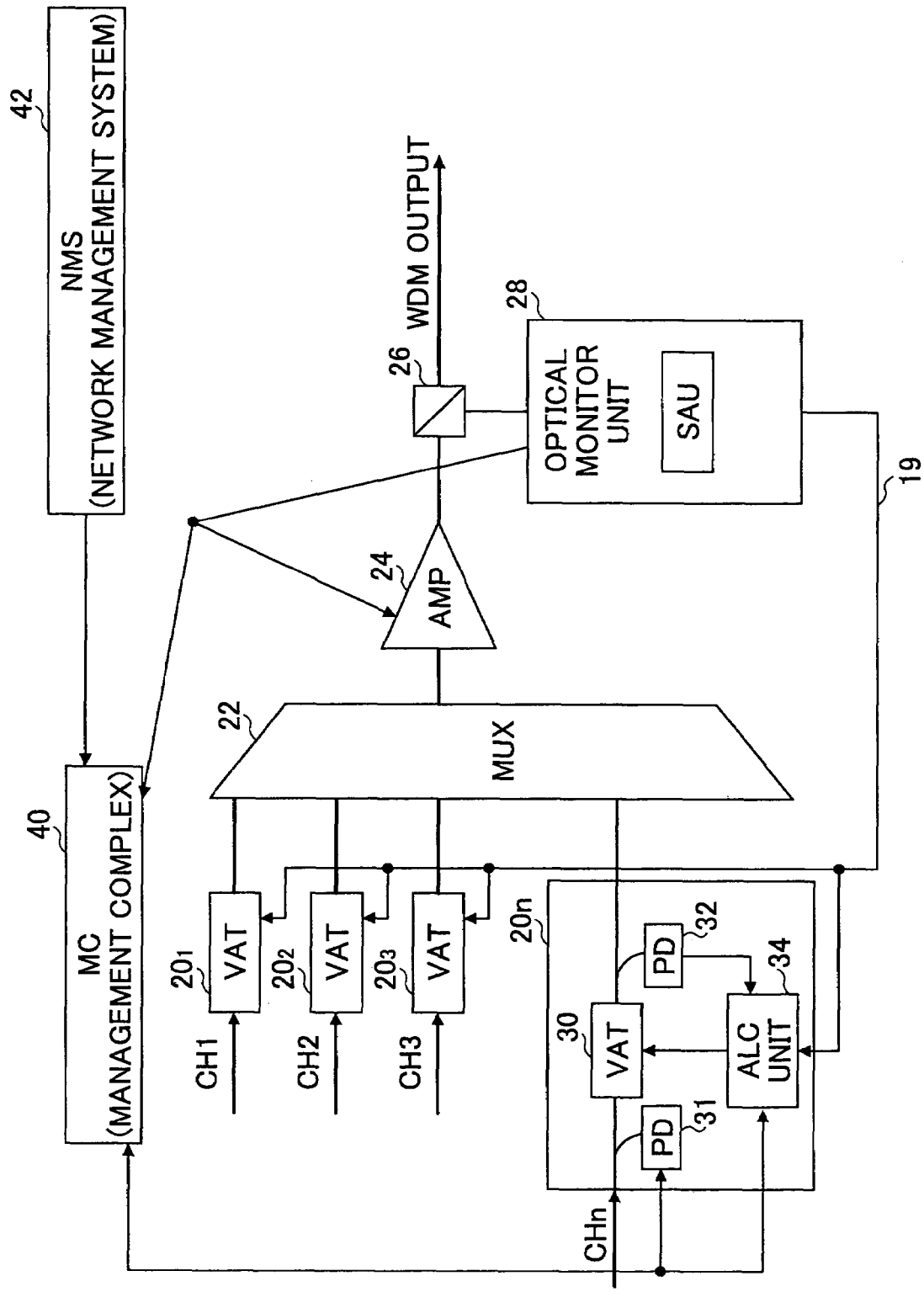
FIG. 4 is a block diagram of a WDM apparatus according to an embodiment of the present invention.

FIG. 4 is a block diagram of a wavelength multiplexing apparatus (WDM apparatus) according to the embodiment of the present invention. In FIG. 4, wavelengths (optical channels) CH1 through CHn pass through variable optical attenuator units (VAT) $20_1$ through $20_n$, respectively, and are supplied to a multiplexing unit (MUX) 22, where the wavelengths are multiplexed, and become a multiplexed signal. The multiplexed signal is amplified by a transmitting amplifier (AMP) 24, and is output to an optical transmission path.

A part of the multiplexed and amplified signal output by the transmitting amplifier 24 is branched by an optical coupler 26, and supplied to an optical monitor unit 28. The optical monitor unit 28 analyzes the optical spectrum of the branched signal, using an optical spectrum analyzer (SAU), calculates an attenuation amount to be set to each of the variable optical attenuator units $20_1$ through $20_n$ so that the optical power level of each wavelength becomes a predetermined level, and provides the corresponding attenuation amount to each of the variable optical attenuator units $20_1$ through $20_n$ via a serial interface 19.

Although a detailed illustration is presented only in the case of the variable optical attenuator unit $20_n$, each of the variable optical attenuator units $20_1$ through $20_n$ includes a variable optical attenuator 30, a photo-diode (PD) 31 for monitoring an input level of the variable optical attenuator 30, a photo-diode (PD) 32 for monitoring the output level of the variable optical attenuator 30, and an ALC (automatic level control) unit 34.

A control method of the attenuation amount according to the present invention is as follows. The optical spectrum analyzer 28 measures the output power of each wavelength (spectrum-analysis), and calculates target power to be output from the variable optical attenuator 30 of each wavelength such that the power levels of all the wavelengths, as measured by the optical spectrum analyzer 28, become uniform, and transmits information relative to the target power to the ALC unit 34 of each of the variable optical attenuator units $20_1$ through $20_n$ via the serial interface 19. This is called a main feedback loop.

The feedback control of the variable optical attenuator units $20_1$ through $20_n$, serving each wavelength, is independently carried out such that power of each wavelength measured by the photodiode (PD) 32 for monitoring the output level of the variable optical attenuator 30 becomes the target value. This is called a local feedback loop.

The transmitting cycle of the target value from the optical spectrum analyzer 28, i.e., the main feedback loop, is in the order of 100 ms as conventionally practiced. However, since the variable optical attenuation control is performed in two stages as described above, namely, the main feedback loop and the local feedback loops, a high-speed level control function is obtained by accelerating operations of the ALC unit 34 of each of the variable optical attenuator units $20_1$ through $20_n$, with the corresponding local feedback loop.

As for the operating speed of the variable optical attenuator 30, a variable optical attenuator employing a magnetic optical effect is commercially available, which is capable of operating at about 300 microseconds, providing an operating speed that is hundreds of times faster than conventional variable optical attenuators. Further, a variable optical attenuator capable of operating at an even higher speed is becoming available, such variable optical attenuator being based on the electro-optics effect of lithium niobate, and used in 10 Gbps class high-speed optical modulators and the like. The lithium niobate-based variable optical attenuator is inherently capable of operating at a higher speed than variable optical attenuators based on the magneto-optical effect, and is expected to provide further increases in speed in the future. Consequently, the local feedback loop including the variable optical attenuator 30 is capable of absorbing a level change at a high speed of about one microsecond. Accordingly, propagation of the level change to a downstream WDM section can be suppressed, and an improvement of the characteristics of an optical transmission system can be obtained.

Figure 5:
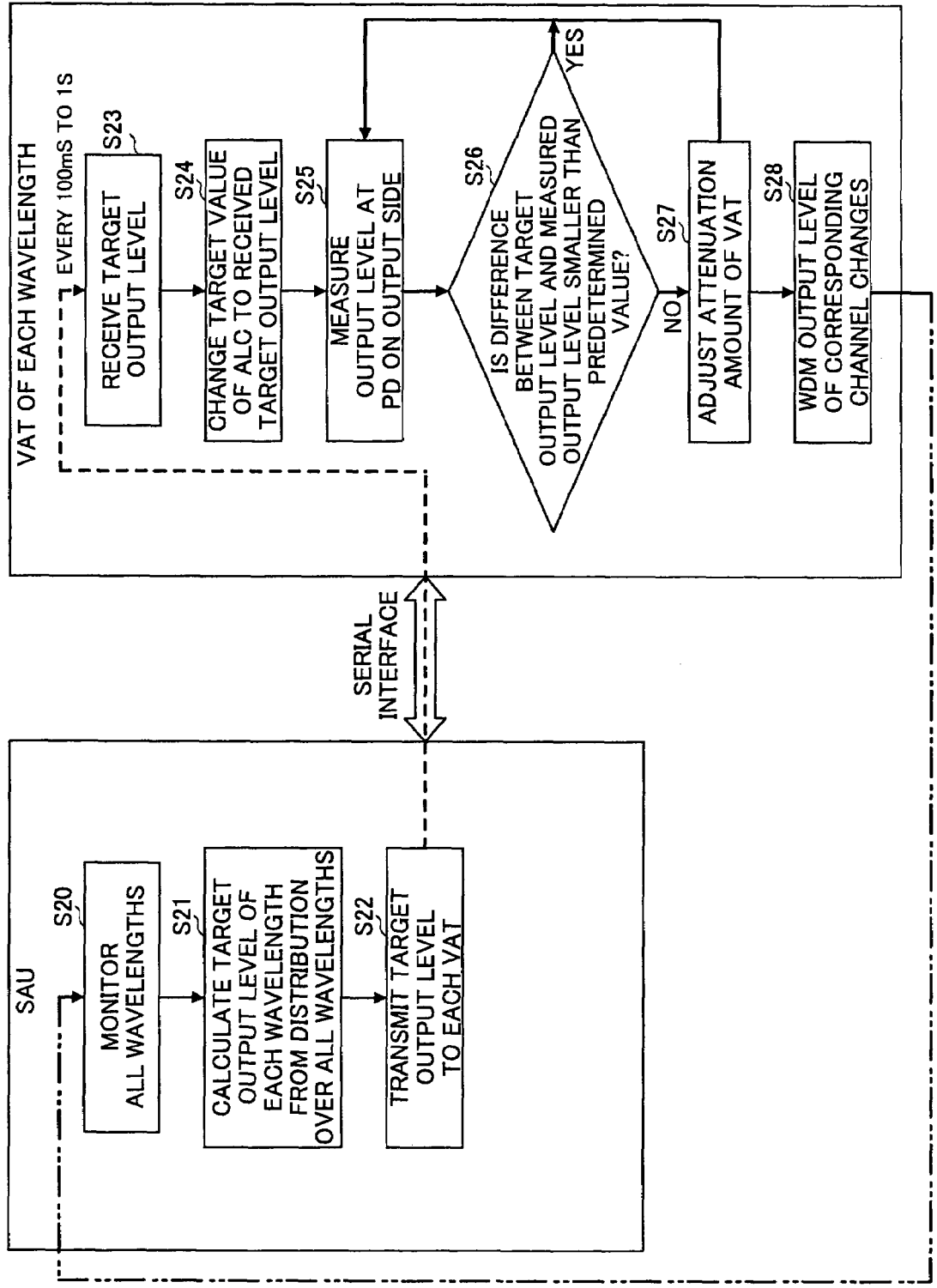
FIG. 5 shows the feedback control method according to the embodiment of the present invention.

FIG. 5 shows the feedback control method of the wavelength multiplexing apparatus of the present invention. The optical spectrum analyzer SAU measures a level (signal strength) of all the wavelengths at Step S20, calculates a new target value of the output level of each wavelength from the variation of the level at Step S21, and transmits the new target values of each wavelength to the corresponding variable optical attenuator units $20_1$ through $20_n$ at Step S22. Then, the variable optical attenuator 30 of each of the variable optical attenuator units $20_1$ through $20_n$ receives the new target value at Step S23, and updates the target value to the new target value at Step S24.

Next, the output level of the variable optical attenuator 30 is measured by the photo-diode 32 at Step S25. At Step S26, it is determined whether the difference between the measured output level and the new target value is less than a predetermined value. If the difference is determined to be greater than or equal to the predetermined value, the attenuation amount of the variable optical attenuator 30 is changed by the amount of the difference at Step S27. Consequently, the output level of the variable optical attenuator 30 is changed at Step S28, and, also on the output side of the WDM apparatus, the level of an applicable channel is changed.

The second problem is related to detecting a disconnection and a level decline of an input optical signal that contains an ASE (amplified spontaneous emission). According to the embodiment of the present invention, the variable optical attenuator units $20_1$ through $20_n$ are set up differently according to whether an input optical signal is from a stable optical source, or from an add/drop apparatus and a cross connect apparatus. Specifically, a threshold level of the photo-diode 31 for detecting the disconnection and the input level decline is set lower in the case of the input optical signal being from the stable optical source than the case of the add/drop apparatus and the cross connect apparatus. In this manner, the second problem is solved, and an optical transmission apparatus that provides stable operations is realized.

Figure 6:
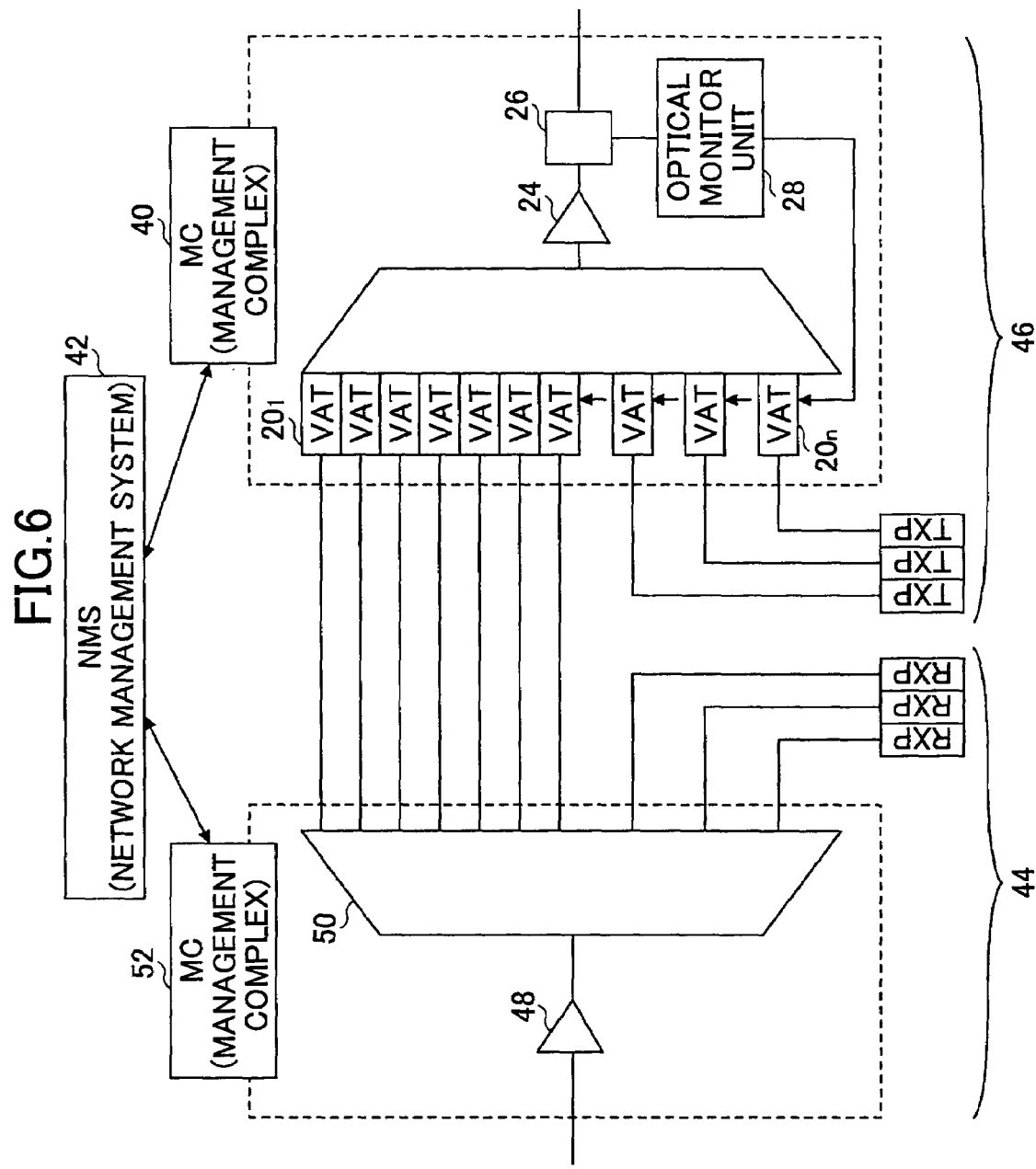
FIG. 6 is a block diagram of an add/drop apparatus, to which the present invention is applied.
Figure 7A:
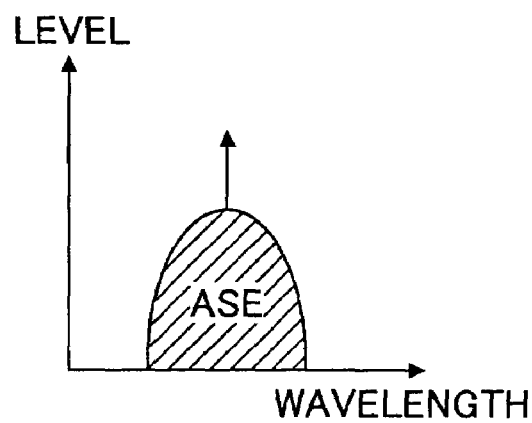
FIG. 7 shows wavelength spectra of a "through" channel and an "add" channel.
Figure 7B:
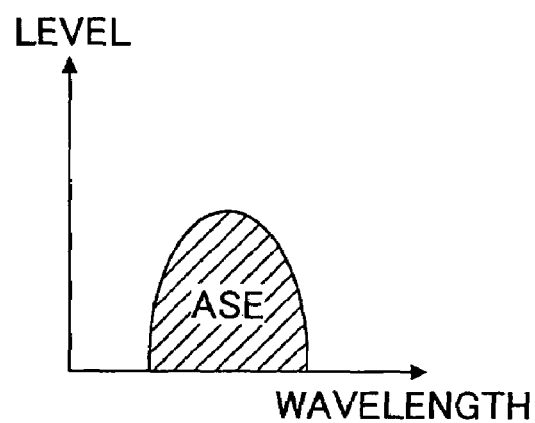
Figure 7C:
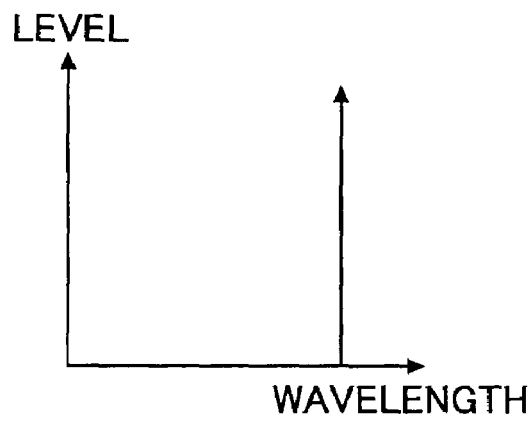
Figure 7D:
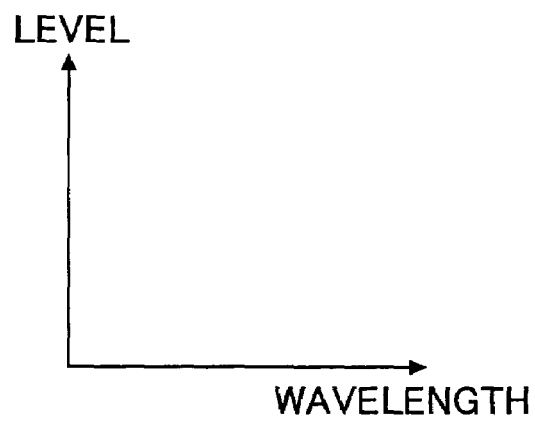

FIG. 6 is a block diagram of an example of the add/drop apparatus to which the present invention is applied. The add/drop apparatus includes a drop unit 44 and an add unit 46. Since the configuration of the add unit 46 is the same as the wavelength multiplexing apparatus shown by FIG. 4, the same reference numbers are used. The drop unit 44 includes a receiving amplifier 48 and a demultiplexing unit (DMUX) 50, and is controlled by a supervisory control unit 52. An optical signal input to the add/drop apparatus is first amplified by the receiving amplifier 48, and demultiplexed by the demultiplexer 50 into n wavelengths. Some of the demultiplexed wavelengths are terminated with respective optical receivers (RXP) as drop channels, with the remaining wavelengths being supplied to the multiplexing unit 22 through the variable optical attenuator units $20_1$ and so on of the add unit 46 as through channels. Further, add channels from optical transmitters (TXP) are supplied to the multiplexing unit 22 through the variable optical attenuator units $20_n$ and others.

Here, the wavelength spectrum of the through channels contains an ASE as shown by (A) of FIG. 7. In the case of the signal being disconnected, only the ASE remains as shown by (B) of FIG. 7. On the other hand, the wavelength spectrum of the add channels does not contain an ASE as shown by (C) of FIG. 7, but includes only the signal. Accordingly, in the case of the signal being disconnected, there are no signals as shown by (D) of FIG. 7. For this reason, the threshold level for detecting the disconnection and the level decline to be set up for the variable optical attenuator unit $20_1$ and so on corresponding to the through channels is made higher than the threshold level to be set up for the variable optical attenuator unit $20_n$ and others corresponding to the add channels.

When the switching function of the add/drop apparatus and the cross connect apparatus is automated, necessary information is stored in a supervisory control unit (Management Complex: MC) 40 that is for controlling the entire wavelength multiplexing apparatus. Therefore, a threshold level for detecting the disconnection and the level decline is provided to each of the variable optical attenuator units $20_1$ through $20_n$ such that the threshold value is set up for the photo-diode 31 of each of the variable optical attenuator units $20_1$ through $20_n$.

In the case of an optical fiber and the like being manually changed, an operator sets up the threshold level for detecting the disconnection and the level decline when changing the configuration and starting up the wavelength multiplexing apparatus. In the case of a network management system (NMS) 42 managing the add/drop apparatus and the cross connect apparatus, the net management system (NMS) 42 sets up the threshold value for each photo-diode 31 of the variable optical attenuator units $20_1$ through $20_n$ via the supervisory control unit 40.

Figure 8:
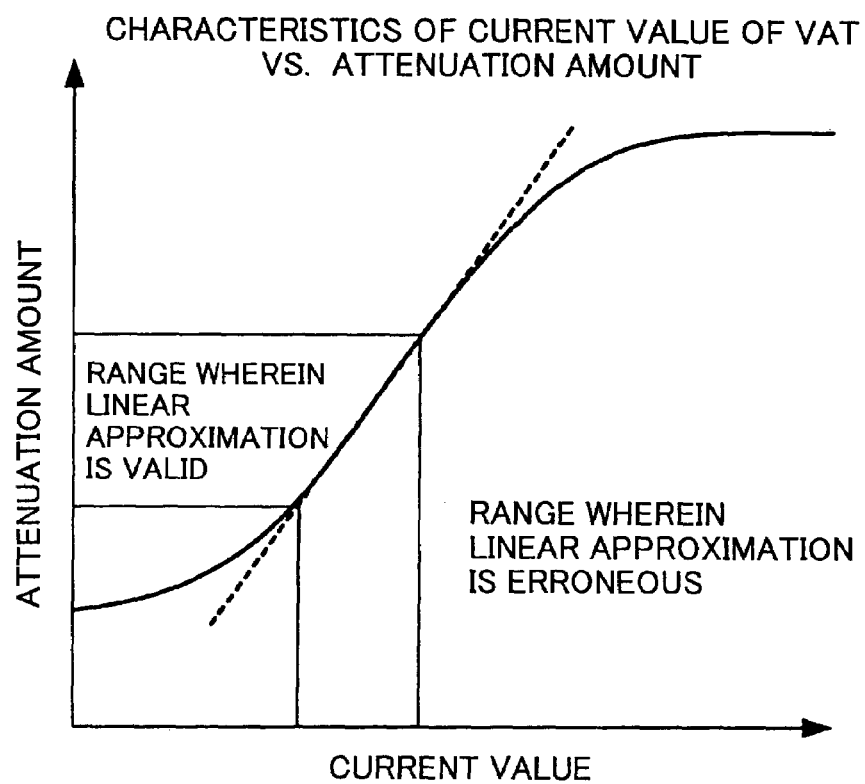
FIG. 8 shows relations between an amount of control current and an attenuation amount of a variable optical attenuator.

The third problem is related to the dynamic range of the variable optical attenuator. While the dynamic range of the variable optical attenuator 30 is about 30 dB (i.e., 1000 times), the linear portion, a range wherein a linear approximation of control current vs. attenuation is valid, is limited as shown by FIG. 8. For this reason, an error is likely to occur when feedback amount is based on the linear approximation. Further, the linearity range varies from attenuator to attenuator.

Figure 9:
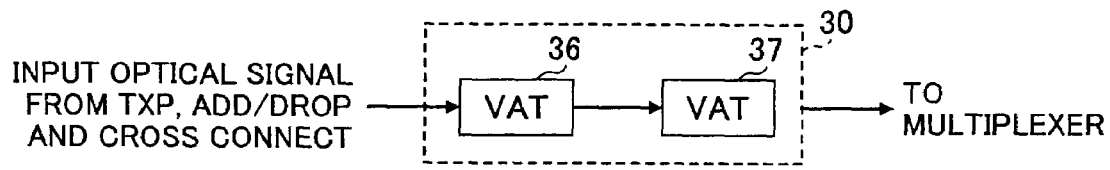
FIG. 9 shows a cascade configuration of variable optical attenuators.

The embodiment of the present invention solving this problem provides two steps of variable optical attenuators 36 and 37 as shown by FIG. 9, which are cascaded. There may be more variable optical attenuators than two according to the embodiment. The plurality of variable optical attenuators constitute the variable optical attenuator 30. A ratio of the attenuation amount of the variable optical attenuators 36 and 37 is properly determined based on the input level of the optical signal.

Figure 10:
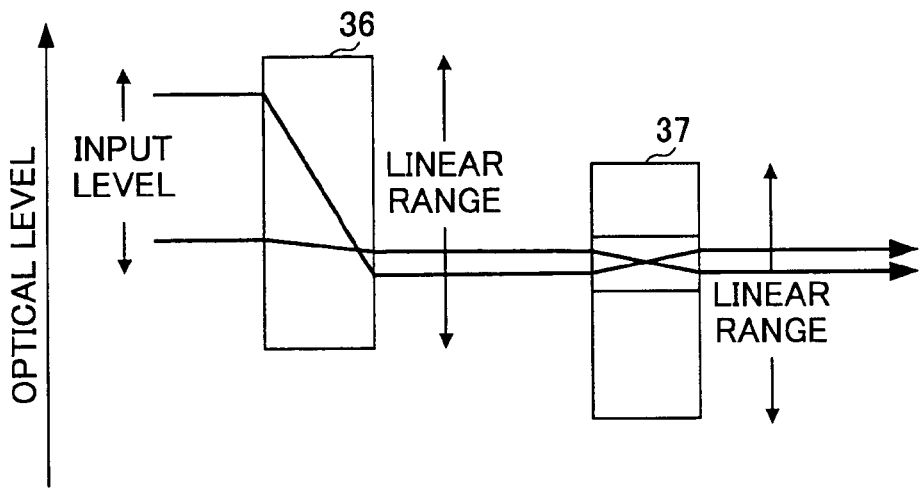
FIG. 10 is a drawing for explaining operations of the variable optical attenuators in the cascade configuration.

As shown in FIG. 10, the variable optical attenuator 36 greatly changes the attenuation amount in the linear range, and the second variable optical attenuator 37 carries out a fine adjustment of less than 1 dB. Since the second variable optical attenuator 37 provides precise control, the first variable optical attenuator 36 does not have to provide high accuracy. In this manner, the dynamic range wherein a highly precise control is attained is expanded.

Since there is a residual loss (insertion loss) of the variable optical attenuator even when the variable optical attenuator is fully released (when no attenuation is applied), the insertion loss of the variable optical attenuator 30 is increased as the number of the variable optical attenuators 36, 37, and so on as applicable, is increased. However, securing the linearity of the variable optical attenuator is the objective of the embodiment, which is achieved as described above, even at the cost of increased insertion loss.

Further, the embodiment of the present invention can be arranged such that the first variable optical attenuator 36 absorbs an input level change that is greater than a threshold value, while the second variable optical attenuator 37 absorbs the input level change that is smaller than the threshold value.

Next, the case wherein an input level suddenly changes in the wavelength multiplexing apparatus shown in FIG. 4 is considered. According to the conventional method where the optical spectrum analyzer SAU directly controls the variable optical attenuator (i.e., through only the main feedback loop), the control cycle of the optical spectrum analyzer is 100 ms or longer, which is far slower than the response speed of the variable optical attenuator, e.g., 0.3 ms; and, for this reason, there are no significant problems relative to relaxation oscillation due to sudden changes in the attenuation amount that is set up. However, in the present invention, since the local feedback loop that operates at a speed near the response speed of the variable optical attenuator 30 is employed, precautions are needed for controlling the feedback at the speed near the limit of the variable optical attenuator 30.

That is, if the difference between the target value and the measured value is fed back to the variable optical attenuator 30 as it is, the relaxation oscillation can occur, generating spike-like level changes, which cause the output of the variable optical attenuator 30 to oscillate, and operations to become unstable. If this occurs, the local feedback loop that is prepared for absorbing the input level changes, instead increases the level change.

In view of the above, according to the embodiment of the present invention, when the difference between the measured value and the target value is great, a smooth adjustment is provided to the variable optical attenuator 30 that independently performs the ALC control such that a sudden change of great difference is avoided, rather than directly reflecting the great difference in the change.

Figure 11:
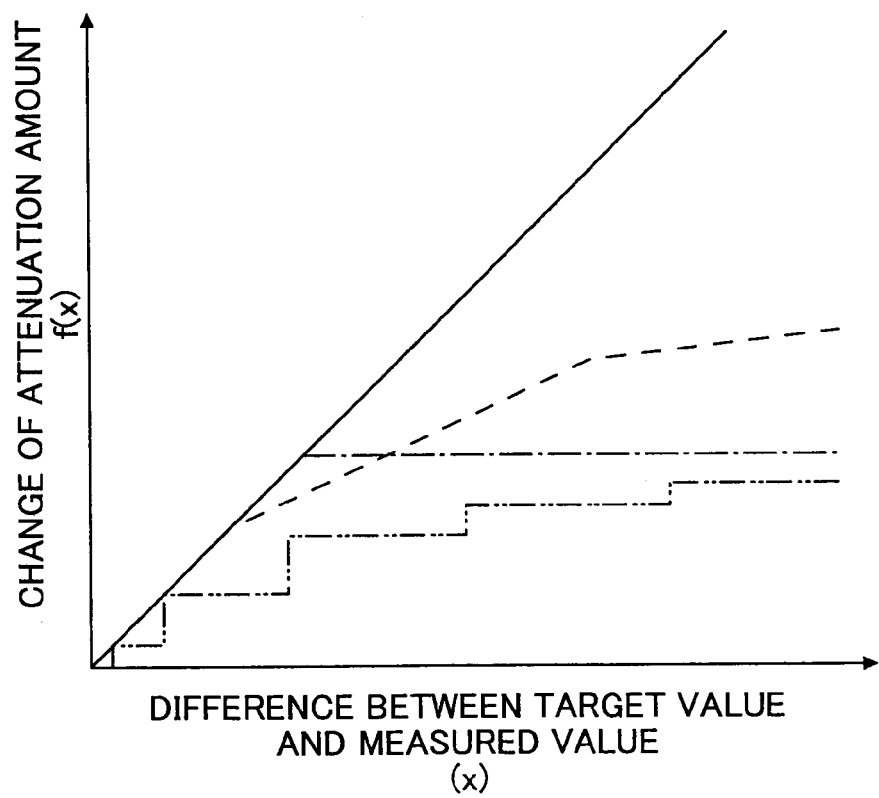
FIG. 11 shows relations between x and f(x), where x represents a difference between a target value and a measured value, and f(x) represents an amount of change of a setting value of the attenuation amount.

Specifically, the smooth adjustment can be realized through a number of methods. With reference to FIG. 11, a solid line indicates the case where the difference between the target value and the measured value is directly reflected in the change value. One of the smoothing methods (the first method) is indicated by a two-dot chain line, having a step form, shown at the bottom of FIG. 11, where the change value is set up in the step form, with the amount of the change being compressed. The second method is indicated by a single-dot straight horizontal line in FIG. 11, where an upper limit is provided to the change value. The third method is indicated by a dashed line in FIG. 11, where the change value is gradually suppressed as the difference increases. The three methods, described above, are examples, and other smoothing methods are conceivable and are included in the present invention.

In this manner, unstable operations of the variable optical attenuator 30, which may otherwise occur in the high-speed local feedback loop, are avoided. Further, this method also contributes to improving the stability of the control that can otherwise be adversely affected by an approximation error when carrying out linear approximation of the characteristics of the variable optical attenuator 30.

Figure 12A:
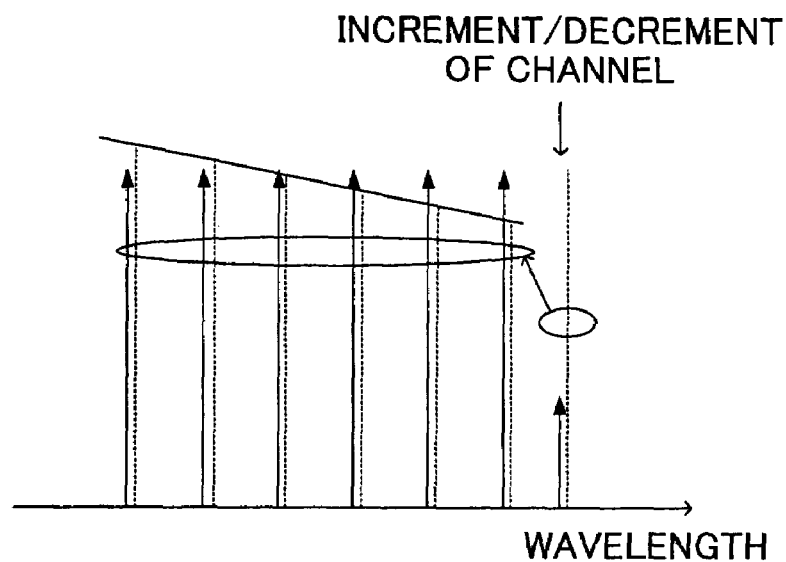
FIG. 12 is a drawing for explaining an influence of incrementing a channel, i.e., wavelength.
Figure 12B:
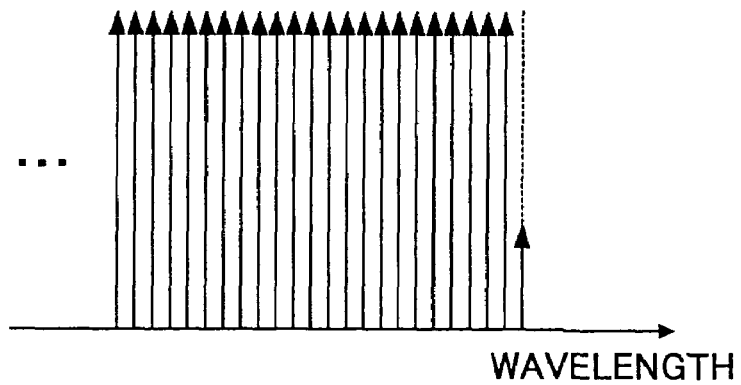
Figure 12C:
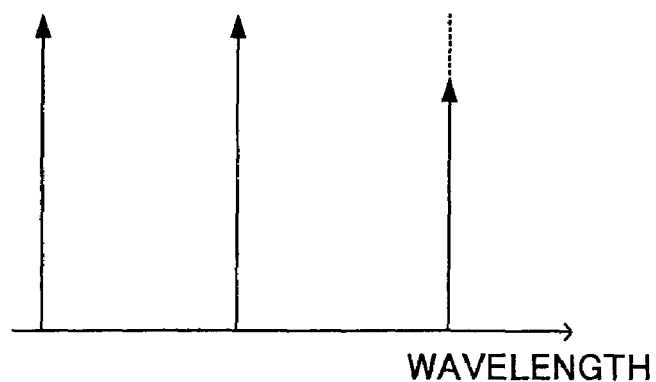

In the wavelength multiplexing apparatus shown by FIG. 4, the output level of the variable optical attenuator 30 is controlled at high speed. However, if the number of wavelengths (channels) is changed too rapidly when incrementing and decrementing the channels, the signals of the wavelengths currently served may be adversely affected, specifically as follows. If the level of a wavelength that is to be incremented or decremented is changed too fast, the total power of the WDM signal rapidly changes, and the excitation status of the optical amplifier changes; and interaction between the wavelengths due to nonlinear optical effects, such as stimulated Raman scattering, changes; and a code error rate may be degraded. For example, when a wavelength is added as shown at (A) of FIG. 12 by a solid line arrow on the right hand end, tilt (inclination) is produced over the levels of the wavelengths as dotted lines show.

Further, the degree of the influence depends on the number of wavelengths. For example, two cases are compared. Namely, in the first case, a wavelength is added to 100 currently serving wavelengths as shown at (B) of FIG. 12; and in the second case, a wavelength is added to two currently serving wavelengths as shown at (C) of FIG. 12. Since the ratio of the power of the incremented channel is greater in the latter case than the former case, the degree of the influence by the incremented channel is greater in the latter case.

As described above, change of the attenuation amount of the variable optical attenuator has to be carried out relatively slowly in the case of incrementing/decrementing a wavelength (channel), and a marginal value of change speed that is safe depends on the number of currently serving wavelengths. That incrementing/decrementing can be completed in a short period of time is one of the important features required of a wavelength multiplexing apparatus.

In view of above, a function is provided to the ALC unit 34 of the variable optical attenuator units $20_1$ through $20_n$ such that the change in attenuation amount can be set up to the variable optical attenuator 30 at a desired speed; and the supervisory control unit 40 that controls incrementing/decrementing is arranged for determining a safe speed, and the safe speed is set up in the ALC unit 34 of the variable optical attenuator units $20_1$ through $20_n$. In this manner, efficient incrementing/decrementing of a wavelength is enabled without adversely influencing currently working channels.

Figure 13:
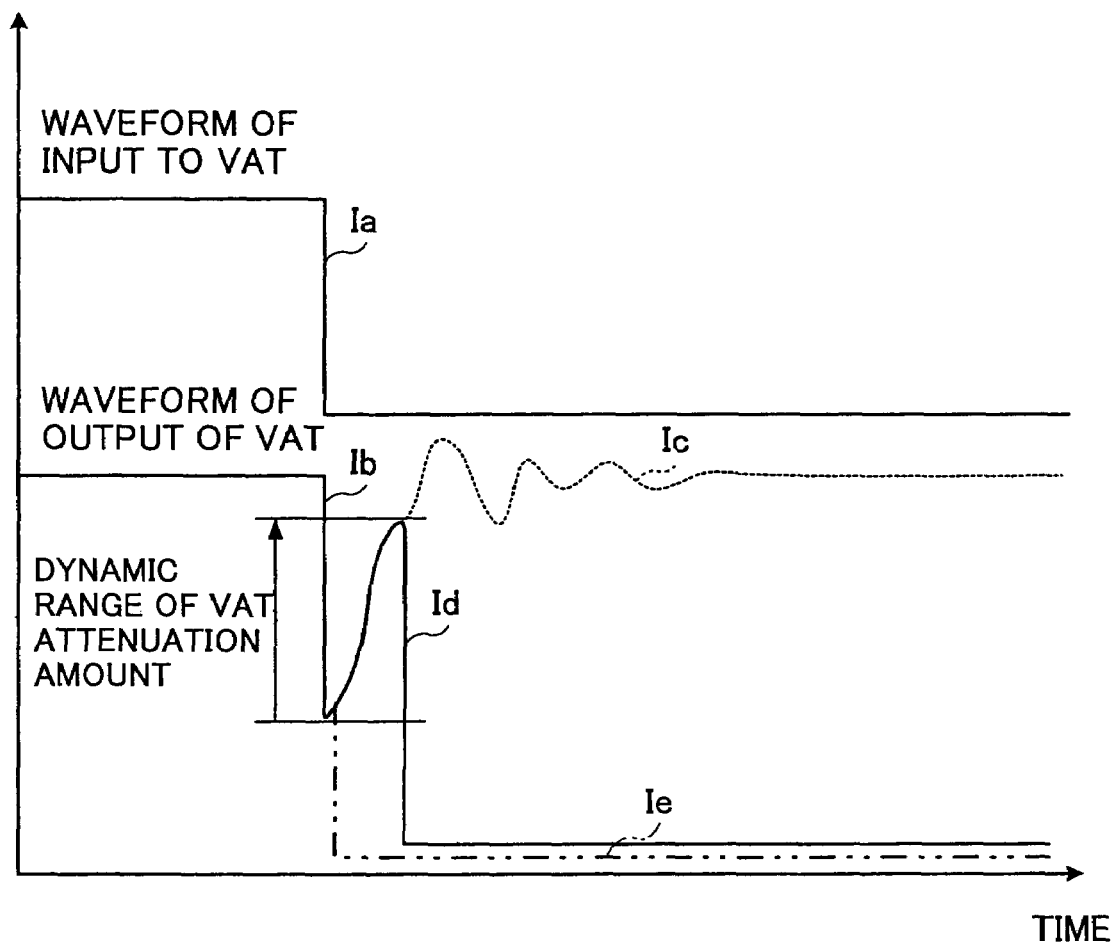
FIG. 13 shows an input waveform and an output waveform of the variable optical attenuator.

Next, two cases are considered with reference to the wavelength multiplexing apparatus shown by FIG. 4, namely, the case wherein the wavelength input to one of the variable optical attenuator units $20_1$ through $20_n$ is disconnected, and the case wherein the input level declines beyond a controllable range of one of the variable optical attenuator units $20_1$ through $20_n$, as shown by a solid line Ia in FIG. 13. In either of the cases, the input level to the variable optical attenuator 30 falls, and therefore, the ALC unit 34 decreases the attenuation amount of the variable optical attenuator 30. If the decrease in the amount of the attenuation of the variable optical attenuator 30 can provide a proper level, the level of the corresponding output wavelength of the variable optical attenuator units $20_1$ through $20_n$ changes as shown by a solid line Ib followed by a dotted line Ic in FIG. 13.

However, if the proper level cannot be provided only by decreasing the attenuation amount of the variable optical attenuator 30, and by fully releasing the attenuation by the variable optical attenuator 30, a shut-down may take place at the time of full release (the attenuation amount is 0) of the variable optical attenuator 30. When the shut-down occurs, the output wavelength takes the shape of a spike, as shown by a solid line Id in FIG. 13. Consequently, detection of the disconnection is delayed, and further, especially, in the add/drop apparatus and the cross connect apparatus, an ASE that comes from the upstream WDM section flows into the downstream WDM section in the shape of a spike. This potentially causes degradation of the code error rate and the like to currently working channels.

To solve the problem as described above, the embodiment provides as follows. When the input disconnection and the level decline take place, the ALC unit 34 of each of the variable optical attenuator units $20_1$ through $20_n$ determines whether the amount of change of the input wavelength is within limits of the dynamic range of the variable optical attenuator 30. If it is determined that an adjustment to provide a proper level is impossible, the ALC control is suspended, the feedback control of the wavelength (channel) in which the disconnection or the level decline takes place is suspended, and the channel is either to be shut down or to retain the latest value, depending on specifications of the wavelength multiplexing apparatus. In this manner, the problem is solved. In this case, the wavelength output from the corresponding variable optical attenuator units $20_1$ through $20_n$ looks like a two-dot chain line Ie in FIG. 13.

When selecting whether the wavelength (channel) is to be shut down or to retain the latest value is determined depending on operational preferences. If the channel should be preserved even if the quality is considerably degraded, the latest value is kept. If, to the contrary, priority should be given to the safety of the other channels, the channel is shut down.

When determining the threshold value for detecting the disconnection and the level decline, as explained in reference to FIG. 6, a fixed value can serve in the case of a stable optical source. In the case of the add/drop apparatus and the cross connect apparatus, a proper threshold value can be set up based on information provided by the upstream WDM apparatus (the drop unit 44 in the case of the add/drop apparatus).

Figure 14:
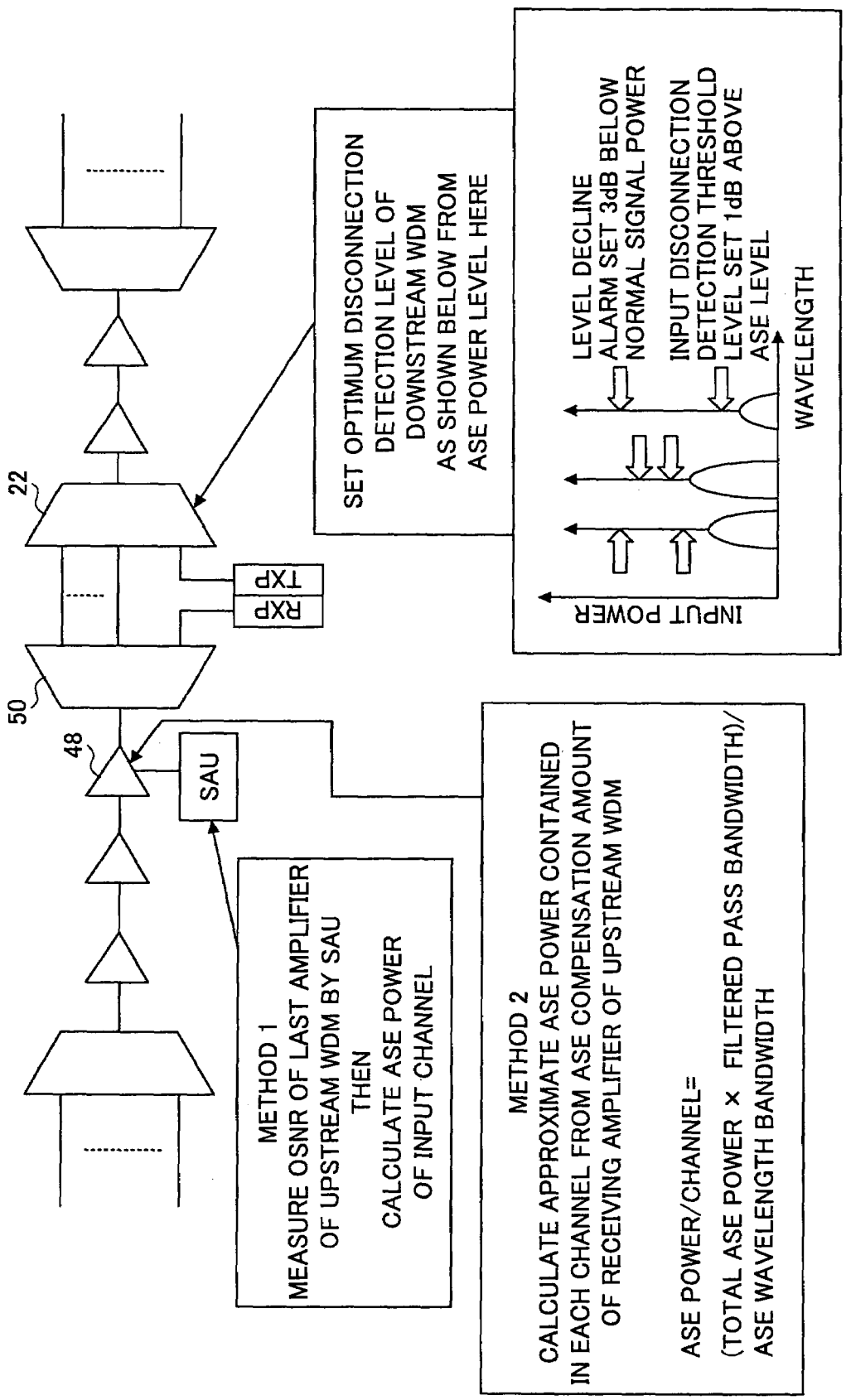
FIG. 14 is a drawing for explaining a threshold level setup for detecting a signal disconnection and a wavelength level decline according to the present invention.

Specifically, as shown in FIG. 14, a ratio of power level of each wavelength to ASE power level is calculated using the respective measurement results of the optical SNR (OSNR) in front of a branch of the upstream WDM apparatus and an ASE compensation amount at the receiving amplifier 48 of the upstream WDM apparatus. Then, the first method is to set up the disconnection detection threshold level at slightly above the ASE power level. The second method is to set up the level decline alarm level at a level at which the power of the wavelength falls by 3 dB from the normal operating conditions. A proper threshold value can be set up by either of the methods. The measurement result of optical SNR or the information about the ASE compensation value may be supplied to the supervisory control unit 40 via the net management system 42, and the threshold value may be set up by the supervisory control unit 40.

In the configuration of the present invention, the photo-diode 32 for monitoring the output of the variable optical attenuator 30 is indispensable in order to carry out the high-speed local feedback, which photo-diode 32 inevitably raises production cost. In a WDM system where 100 or more wavelengths (channels) are accommodated, the cost rise becomes comparatively large, posing a problem.

Since the attenuation amount of the variable optical attenuator 30 is a function of the control current value supplied from the ALC unit 34, the optical power value on the input side of the variable optical attenuator 30 can be calculated by adding the attenuation amount to the optical power value on the output side measured by the photo-diode 32. However, since the relation between the attenuation amount and the control current value varies with individual variable optical attenuator elements, individual characteristics of the variable optical attenuator 30 are measured in advance, and stored in an EEPROM and the like. Using the information about the individual characteristics, the optical power on the input side can be obtained (calculated), and, accordingly, the photo-diode 31 on the input side can be eliminated. In this manner, the high-speed ALC control is realized, avoiding a cost increase.

Figure 15:
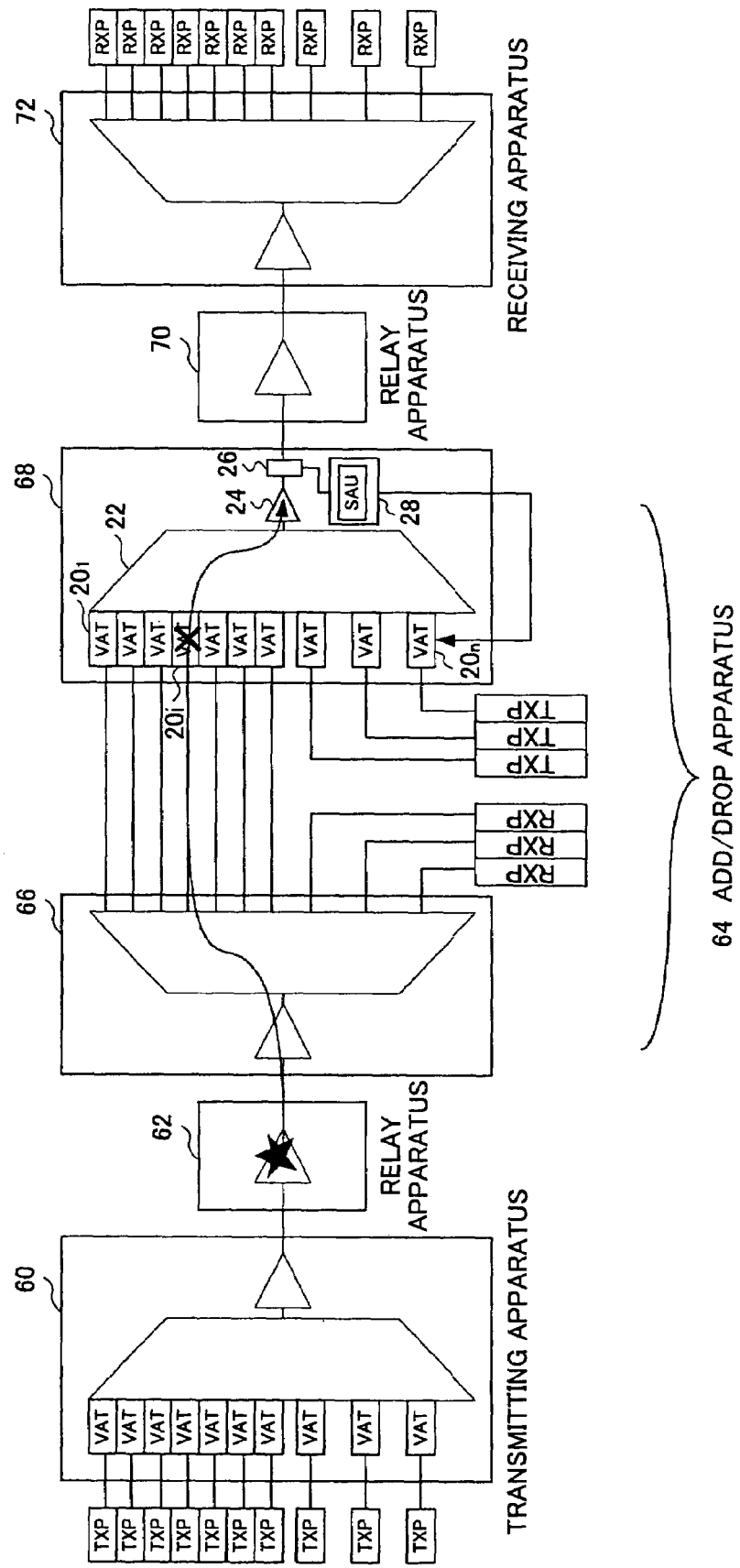
FIG. 15 is a block diagram of an add/drop apparatus according to the embodiment of the present invention, to which the wavelength multiplexing apparatus of the present invention is applied.

FIG. 15 is a block diagram of an embodiment of an add/drop apparatus 64 to which the present invention is applied. With reference to FIG. 15, an optical signal transmitted from a transmitting apparatus 60 is input to the add/drop apparatus 64 through a relay apparatus 62. The optical signal is demultiplexed into n channels (wavelengths) by a drop unit 66 of the add/drop apparatus 64. Some of the demultiplexed channels are supplied to an add unit 68 as they are, which are called through channels, and are to be multiplexed again. Each of the remaining demultiplexed channels is dropped, and terminated to an optical receiver (RXP). Further, a wavelength from an optical transmitter (TXP), constituting a new channel, is provided to the multiplexing unit 22 through a variable optical attenuator for multiplexing. The through channels and the new channel are multiplexed by the multiplexing unit 22. The multiplexed signal is provided to a receiving set 72 through a relay apparatus 70.

Here, by applying the high-speed ALC control method of the present invention to the control system on the transmission side of the add/drop apparatus 64, a level change of a certain wavelength generated by the relay apparatus 62 on the upstream side can be absorbed by a variable optical attenuator unit 20$i$ corresponding to this wavelength, and, in this manner, influencing the downstream side is avoided.

Figure 16:
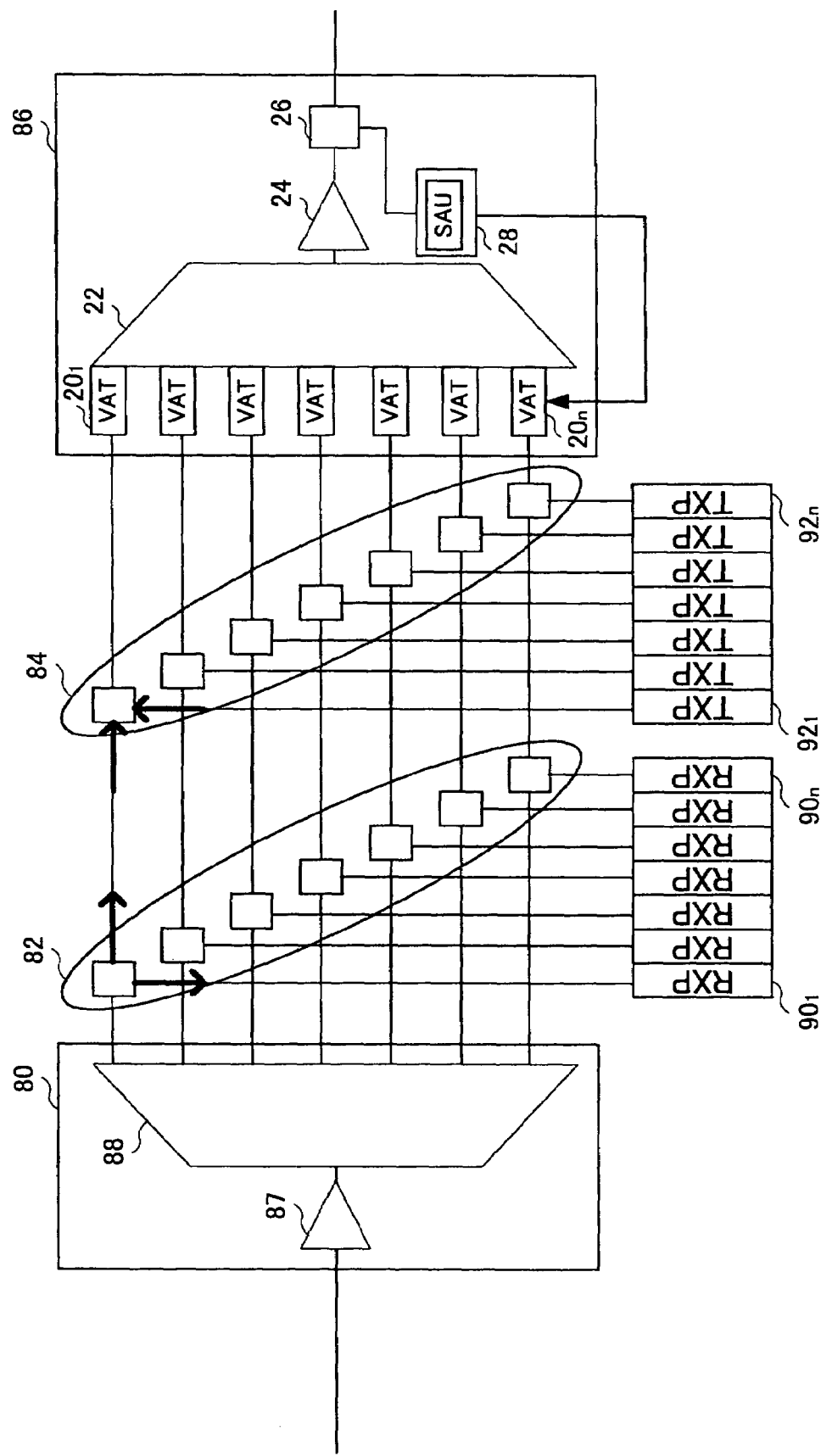
FIG. 16 is a block diagram of a cross connect apparatus according to the embodiment of the present invention, to which the wavelength multiplexing apparatus of the present invention is applied.

FIG. 16 is a block diagram of an embodiment of a cross connect apparatus to which the present invention is applied. The cross connect apparatus includes a wavelength separation unit 80, an optical switch array 82 for "drops" (channels to be dropped), an optical switch array 84 for "adds" (channels to be added), and a wavelength multiplexing unit 86. Since the configuration of the wavelength multiplexing unit 86 is the same as that of the wavelength multiplexing apparatus of FIG. 4, the same reference numbers are given.

The wavelength separation unit 80 includes a receiving amplifier 87 and a demultiplexing unit (DMUX) 88 that demultiplexes (separates) the multiplexed signal into two or more wavelengths (channels). The wavelengths are provided to one of the wavelength multiplexing unit 86 as through channels via the optical switch arrays 82 and 84, and optical receivers (RXP) $90_1$ through $90_n$ by switching operations of the optical switch array 82 as drop channels. Further, add channels from optical transmitters (TXP) $92_1$ through $90_n$ are provided to the variable optical attenuator units $20_1$ through $20_n$, respectively, of the wavelength multiplexing unit 86 by switching operations of the optical switch array 84.

In this configuration, when an optical signal provided to the wavelength multiplexing unit 86 is changed from an optical signal of a through channel to an optical signal of an optical transmitter, and vice versa, the input level to the corresponding variable optical attenuator units $20_1$ through $20_n$ of the wavelength multiplexing unit 86 is sharply changed. According to the embodiment, to which the present invention is applied, the wavelength multiplexing unit 86 can absorb the level change, enabling the performing of channel switching without affecting other channels.

Although the optical signal of the drop channel, and the optical signal of the add channel from the optical transmitter are switched according to the configuration shown by FIG. 16, the present invention is also applicable to a cross connect apparatus that switches drop channels that arrive from different paths.

As described above, according to the present invention, an optical transmission system containing an add/drop apparatus and a cross connect apparatus is capable of preventing an optical level change generated in an upstream WDM section from flowing into a downstream WDM section, thereby eliminating restrictions on the number of stages of the add/drop apparatuses and the cross connect apparatuses, and the total transmission distance. In this manner, a highly efficient optical transmission system is realized.

In addition, the photo-diode 32 corresponds to input optical level detecting means, the ALC unit 34 corresponds to attenuation amount controlling means, the photo-diode 31 corresponds to alarm detecting means, and the supervisory control unit 40 corresponds to threshold level controlling means, the means being referred to in claims that follow.

As described above, according to the present invention, the attenuation amount the variable optical attenuator can be controlled at high speed, preventing an optical level change generated in the upstream WDM section from flowing into the downstream WDM section.

Further, according to the present invention, inaccurate detection of disconnection and level decline alarm due to the input optical signal containing an ASE is avoided.

Further, according to the present invention, the range in which the input dynamic range of the variable optical attenuator can be precisely controlled is expanded.

Further, according to the present invention, oscillation of the output of the variable optical attenuator is avoided, providing reliable operations of the wavelength multiplexing apparatus.

Further, the present invention is not limited to these embodiments, but various variations and modifications may be made without departing from the scope of the present invention.

The present application is based on Japanese priority application No. 2002-303896 filed on Oct. 18, 2002 with the Japanese Patent Office, the entire contents of which are hereby incorporated by reference.

What is claimed is:

1. A wavelength multiplexing method wherein a plurality of optical signals, each being assigned a unique wavelength, are input to and output from a plurality of variable optical attenuators, respectively, wavelength-multiplexed by a multiplexer, and output from said multiplexer; said wavelength-multiplexed output is spectrum-analyzed by an optical monitor unit, and a spectrum-analyzed level of each of said optical signals is measured; and an input level of each of said optical signals input from said respective variable optical attenuator to said multiplexer is adjusted by said respective variable optical attenuator such that the spectrum-analyzed levels of all said optical signals become the same, the method comprising the steps of:
    detecting said input level of each of said optical signals from said respective variable optical attenuator to said multiplexer, and
    controlling an attenuation amount of each of said variable optical attenuators based on a difference between said input level of said respective optical signal from said variable optical attenuator to said multiplexer and said spectrum-analyzed level measured by said optical monitor unit.

2. A wavelength multiplexing apparatus wherein a plurality of optical signals, each being assigned a unique wavelength, are input to and output from a plurality of variable optical attenuators, respectively, wavelength-multiplexed by a multiplexer, and output from said multiplexer; said wavelength-multiplexed output is spectrum-analyzed by an optical monitor unit, and a spectrum-analyzed level of each of said optical signals is measured; and an input level of each of said optical signals input from said respective variable optical attenuator to said multiplexer is adjusted by said respective variable optical attenuator such that the spectrum-analyzed levels of all said optical signals become the same, comprising:
    input optical level detecting means for detecting said input level of each of said optical signals from said respective variable optical attenuator to said multiplexer, and
    attenuation amount controlling means for controlling an attenuation amount of each of said variable optical attenuators based on a difference between said input level of said respective optical signal from said variable optical attenuator to said multiplexer and said spectrum-analyzed level measured by said optical monitor unit.

3. The wavelength multiplexing apparatus as claimed in claim 2, further comprising:
    alarm detecting means for detecting an alarm when said input level detected by said input optical level detecting means is determined to be lower than a predetermined threshold level, and
    threshold level controlling means for adjusting said threshold level of said alarm detecting means based on whether each of said optical signals is input from a stable optical source.

4. The wavelength multiplexing apparatus as claimed in claim 2, wherein each of said variable optical attenuators is configured by two or more variable optical attenuators that are cascaded.

5. The wavelength multiplexing apparatus as claimed in claim 2, wherein said attenuation amount controlling means control the attenuation amount of each of said variable optical attenuators such that a prevailing attenuation amount is changed by an amount that is smaller than a difference between said spectrum-analyzed level and said input level from said variable optical attenuator.

6. The wavelength multiplexing apparatus as claimed in claim 5, wherein said attenuation amount controlling means change said attenuation amount of each of said variable optical attenuators in steps based on the difference between the spectrum-analyzed level and the input level from the variable optical attenuator.

7. The wavelength multiplexing apparatus as claimed in claim 5, wherein said attenuation amount controlling means set up a maximum amount of change of the attenuation amount of the variable optical attenuator where the difference between the spectrum-analyzed level and the input level from the variable optical attenuator is greater than a predetermined value.

8. The wavelength multiplexing apparatus as claimed in claim 5, wherein said attenuation amount controlling means change the attenuation amount according to a curve, a tangent of the curve being gradually decreased with respect to an increase of the difference between the spectrum-analyzed level and the input level from the variable optical attenuator.

9. The wavelength multiplexing apparatus as claimed in claim 2, wherein said attenuation amount controlling means suspend controlling of the attenuation amount of the variable optical attenuator when level change of the input optical signal exceeds a dynamic range of the variable optical attenuator.

10. The wavelength multiplexing apparatus as claimed in claim 3, wherein said threshold level controlling means adjust said threshold level of said alarm detecting means based on information relative to an amplified spontaneous emission power level, the information being provided by an upstream wavelength multiplexing apparatus.

11. The wavelength multiplexing apparatus as claimed in claim 3, further comprising input level calculating means for calculating the input level to each of said variable optical attenuators based on the output level of said respective variable optical attenuator of the optical signal detected by said optical level detecting means, wherein said alarm detecting means perform alarm detection when the input level calculated by said input level calculating means is less than said threshold value.

* * * * *